Figure 3:
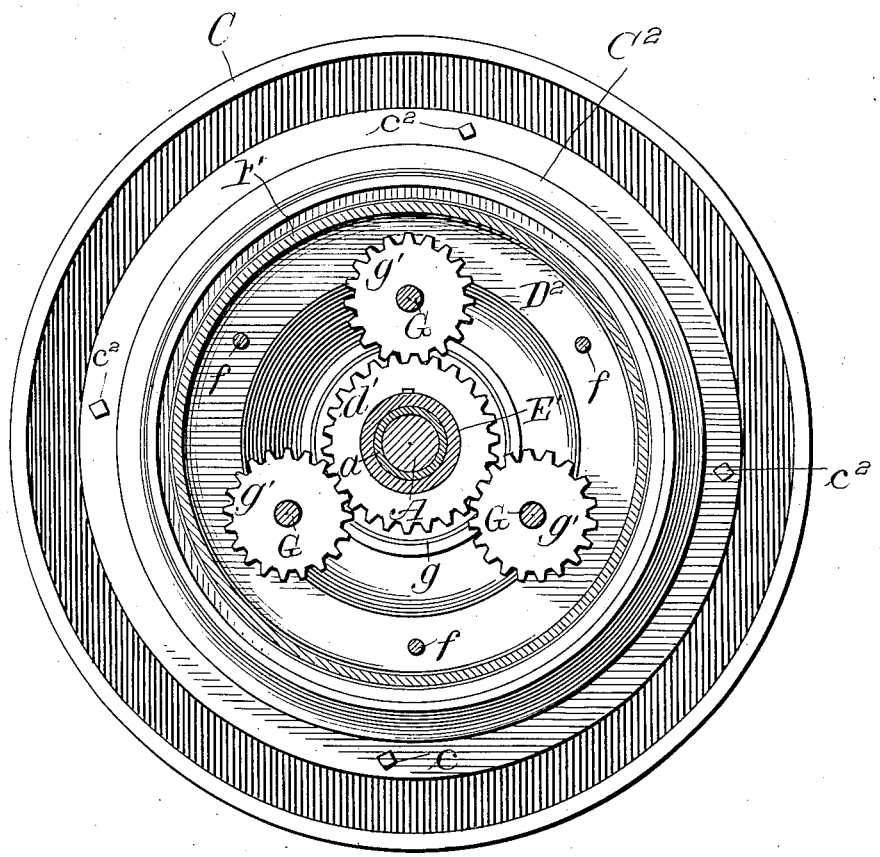

R. SYMMONDS.
SPEED CHANGING MECHANISM.
APPLICATION FILED APR. 9, 1904.
929,997.
Patented Aug. 3, 1909.
2 SHEETS—SHEET 1.
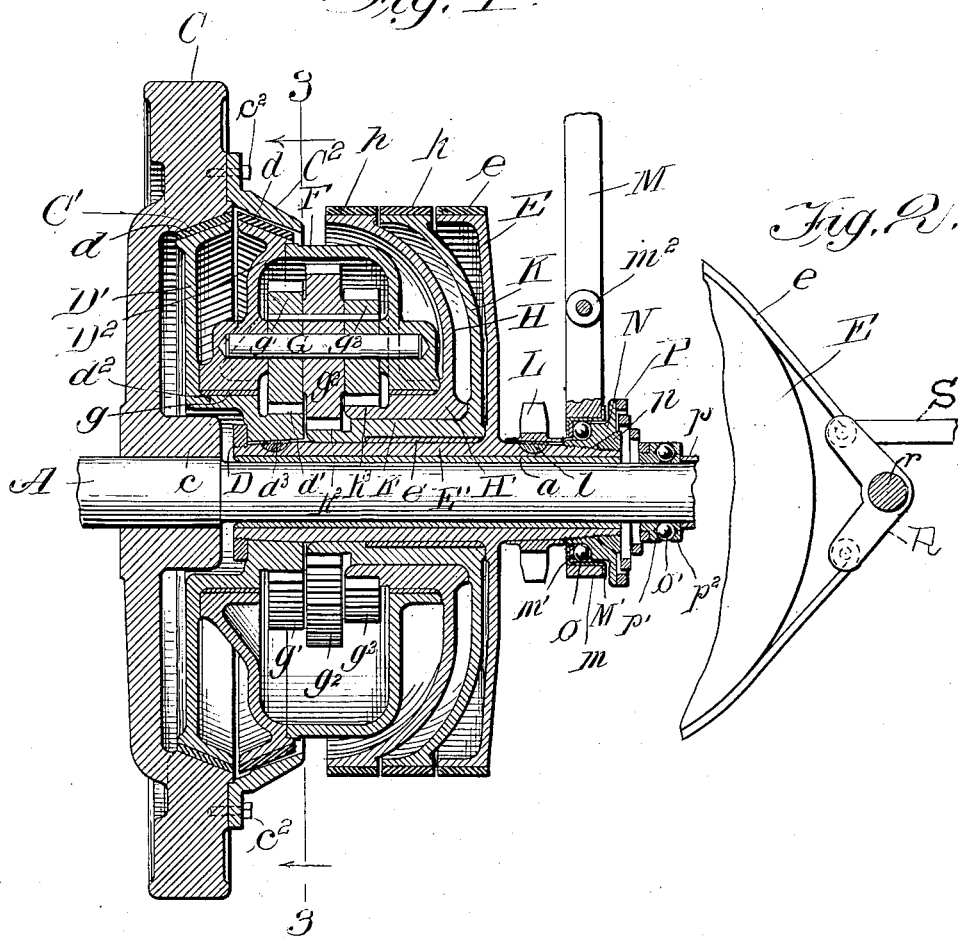

R. SYMMONDS.
SPEED CHANGING MECHANISM.
APPLICATION FILED APR. 9, 1904.

929,997.

Patented Aug. 3, 1909.
2 SHEETS—SHEET 2.

UNITED STATES PATENT OFFICE.

ROBERT SYMMONDS, OF KENOSHA, WISCONSIN, ASSIGNOR TO THOMAS B. JEFFERY, OF KENOSHA, WISCONSIN.

SPEED-CHANGING MECHANISM.

No. 929,997.     Specification of Letters Patent.     Patented Aug. 3, 1909.

Application filed April 9, 1904. Serial No. 202,468.

*To all whom it may concern:*

Be it known that I, ROBERT SYMMONDS, a citizen of the United States, residing at Kenosha, county of Kenosha, State of Wisconsin, have invented a certain new and useful Improvement in Speed-Changing Mechanism, and declare the following to be a full, clear, and exact description of the same, such as will enable others skilled in the art to which it pertains to make and use the same, reference being had to the accompanying drawings, which form a part of this specification.

My invention relates in general to power transmission mechanism, and more particularly to differential gearing interposed between a motor and a driven element whereby the latter may be rotated at various speeds in one direction, or in a reverse direction.

It is desirable, especially in automobiles, to so connect the motor with a driven element, which in turn is operatively connected to the rear axle of the automobile, that the speed and power transmitted from the motor may be varied at the will of the operator, and that the direction of rotation of the driven element may be reversed while the motor continues to run in the same direction.

The primary object of my invention is to provide transmission mechanism for connecting a motor to a driven element, which may be readily adjusted to inversely vary the speed and power of rotation of the element or to reverse the direction of rotation thereof.

A further object of my invention is to provide a differential transmission mechanism which will be simple in construction, inexpensive in manufacture, and efficient in operation.

My invention, generally described, consists in a shaft rotatively connected to a motor, a fly wheel fixed upon the shaft, having fixed thereon the members of two separate clutches, an axially movable clutch member coöperating with one of said fixed clutch members loosely surrounding the shaft, a sleeve constituting a driven element loosely supported upon the shaft and rigidly connected to said movable clutch member, a second axially movable clutch member coöperating with the second fixed clutch member loosely surrounding the hub of the first member, a disk secured to said second movable clutch member and forming therewith a carrier in which are journaled stub shafts having fixed thereon three pinions, one of said pinions meshing with a relatively larger gear carried by said sleeve, a larger one of said pinions meshing with a relatively smaller gear carried by a second sleeve loosely surrounding the first sleeve, and a third and smallest of said pinions meshing with a relatively larger gear carried by a third sleeve loosely surrounding the second sleeve, means for separately stopping the rotation of each of said sleeves, and means for moving said first sleeve and with it the surrounding sleeves and movable clutch members axially upon the driving shaft, thereby engaging the members of one clutch and disengaging the members of the other clutch.

My invention will be more fully described hereinafter with reference to the accompanying drawings in which the same is illustrated as embodied in a convenient and practical form, and in which—

Figure 1 is a central sectional view; Fig. 2 a detail view of the clutch band operating mechanism; and Fig. 3 a sectional view on line 3—3, Fig. 1.

The same reference characters are used to designate the same parts in the three figures of the drawings.

Reference letter A indicates a shaft which is rotated by any suitable power connections, such for instance as a direct connection with the engine of an automobile.

C designates a fly wheel the hub $c$ of which surrounds and is fixed to the shaft A.

$C'$ designates a clutch member rigidly carried by the shaft and preferably formed integrally with the fly wheel C. $C^2$ designates one member of a second clutch and is also carried by the fly wheel C. Any suitable means may be provided for securing the member $C^2$ to the fly wheel, such for instance as bolts $c^2$ extending through a radial flange of the clutch member into engagement with the fly wheel. The surfaces of the two fixed clutch members $C'$ and $C^2$ are preferably conical and so arranged that their greatest diameters are adjacent each other.

$D'$ designates a movable clutch member adapted to coöperate with the fixed member $C'$. The clutch member $D'$ concentrically surrounds and is fixed to the inner end of a sleeve $E'$ which constitutes a driven element. Any suitable means may be provided for fixing the member D' upon the sleeve E', such for instance as a lock ring D in screw threaded engagement with the end of the sleeve and a key $d^3$.

A second movable clutch $D^2$ is located in operative relation to the second fixed clutch member $C^2$. The clutch member $D^2$ is rotatively mounted upon a circular shoulder $d^2$ formed on the movable clutch member D'. Leather or other wearing surfaces $d$ are preferably interposed between the coöperating members of the two clutches to insure a tight engagement between the members.

A circular casing F concentrically surrounds the driving shaft A and is rigidly secured to the clutch member $D^2$ by any suitable means, such for instance as bolts $f$, (see Fig. 3). Inclosed within the casing F and interposed between the same and the clutch member $D^2$ are two or more, preferably three, stub shafts G upon each of which are journaled three pinions $g'$, $g^2$, and $g^3$, rigidly united together by any suitable means, such for instance as dowel pins. Each of the pinions $g'$ meshes with a relatively larger gear $d'$ fixed upon the sleeve E' and preferably formed integrally with the hub of the clutch member D'. The pinions $g^2$ are larger than the pinions $g'$ and each of them meshes with a relatively smaller pinion $k^2$ formed upon the end of a sleeve K', the latter loosely surrounding the sleeve E'. The pinions $g^3$ which are smaller than either of the pinions $g'$ and $g^2$ mesh with a gear $h^3$ carried by a third sleeve H' relatively surrounding a second sleeve K'.

Suitable bushings are interposed between the relatively movable parts, such for instance as a lining $a$ between the shaft A and the sleeve E', a lining $e'$ between the sleeves E' and K', and a bushing $g$ between the hub $d^2$ and the surrounding clutch member $D^2$.

The adjacent ends of the concentric sleeves E', K', and H', are provided with disks E, K and H preferably formed integral with and projecting radially around the respective sleeves. Each of the disks referred to is provided with a peripheral circular flange surrounded by a clutch band. $e$, $k$, and $h$ designate the clutch bands which surround and are adapted to grip the circular flanges on the respective disks E, K and H. Any suitable mechanism is provided for separately causing the clutch bands to grip the flanges which they surround and thereby lock the sleeves, which concentrically surround the driving shaft, against rotation. In Fig. 2 I have shown as a means for causing the clutch band $e$ to grip the circular flange on the disk E, a bell crank R fulcrumed upon a rod $r$, to the arms of which the ends of the band $e$ are connected. S indicates a suitable connection for oscillating the bell crank lever and thereby tightening the band around the flange. Similar mechanism (not shown) may be provided for actuating the bands $h$ and $k$.

Surrounding and fixed upon the sleeve E' is a sprocket wheel L or other suitable power transmitting device, by means of which rotary motion is communicated to the mechanism which is to be driven, such for instance as the rear axle of an automobile. A key $l$ is shown as the means for non-rotatively securing the sprocket wheel upon the sleeve E'.

N indicates a disk concentrically surrounding the end of the sleeve E' and secured thereon through a screw-threaded engagement.

$n$ designates a locking ring for securely retaining the disk N upon the end of the sleeve. Located adjacent to and surrounding the hub of the disk N is a yoke $m$ connected to and preferably formed integrally with an oscillating lever M pivoted at $m^2$. Within the yoke $m$ is a lining M' of tough metal spaced apart from the inner surface of the disk N to form a race-way in which are located ball bearings $o$.

$m'$ designates a washer of tough metal located within the inwardly extending radial flange of the lining M' to assume the wear of the ball bearings.

A pair of collars $p'$ and $p^2$ surround the shaft A a short distance from the end of the sleeve E and form a race-way for ball bearings $o'$ interposed between the collars. Any suitable means may be provided for preventing the axial movement of the collar $p^2$ to the right, such for instance as a ring $p$ fixed upon the shaft. Interposed between the disk N and the collar $p'$ is a spring P the tension of which tends to move the sleeve E' and thereby force the clutch D' into engagement with the coöperating fixed clutch member C'.

The operation of my invention is as follows: The shaft A is rotated through its connection with the motor and with it rotates the fly wheel C and fixed clutch members C' and $C^2$. When it is desired to rotate the driven element E' and with it the mechanism operatively connected to the sprocket wheel L at the same speed at which the shaft is rotated, the lever M is oscillated to the position shown in Fig. 1, thereby permitting the spring P to expand and move the sleeve E' toward the left in Fig. 1 and force the movable clutch member D' into engagement with the fixed clutch member C'. When it is desired to disconnect the driven mechanism from the driving shaft A so as to permit the engine to run idly, the lever M is oscillated so as to partially compress the spring P and disengage the clutch member D' from the clutch member C' without however moving the clutch member $D^2$ into contact with the coöperating member $C^2$.

When it is desired to rotate the driven element at a slower speed than that at which the driving shaft A rotates, the lever M is oscillated so as to further compress the spring P and move the clutch member $D^2$ into forcible engagement with the coöperating member $C^2$. The clutch band $k$ is then caused to grip the flange of the disk K and prevent the rotation of the sleeve K'. The pinion carrier, consisting in the clutch member $D^2$ and the casing F, then rotates with the shaft A. The pinion $k^2$ is held immovable and as it is smaller than the pinion $g^2$ meshing therewith, the latter does not make a complete revolution about the stub shaft G while it is being carried with the clutch member $D^2$ completely around the pinion $k^2$. As the pinion $g'$ is rigidly secured to the pinion $g^2$ it does not make a complete revolution around the supporting stub shaft, while it is making a complete revolution with the clutch member $D^2$, consequently as the pinion $g'$ is smaller than the gear wheel $d'$ with which it meshes, the latter is rotated less than a complete revolution during each revolution of the pinion carrier. The relative sizes of the pinions $k^2$, $g^2$, $g'$, and gear $d'$ are preferably such that the gear wheel $d'$ makes a third of one revolution while the pinion carrier is making a complete revolution. The sprocket wheel L is therefore rotated at slow speed and with increased power.

When it is desired to rotate the driven element and with it the mechanism operatively connected to the sprocket wheel L in a direction the reverse of that in which the shaft A is rotating, the lever M continues in position to force the clutch member $D^2$ into engagement with the coöperating member $C^2$ and the clutch band $h$ is caused to grip the circular flange which it surrounds and thereby lock against rotation the sleeve H'. As the pinion $g^3$ is smaller than the gear $h^3$ with which it meshes and which is held stationary, each revolution of the pinion carrier causes the pinion $g^3$ to make more than one revolution about its supporting stub shaft G. This increased speed is communicated to the pinion $g'$ through the intermediate pinion $g^2$ to which both of the pinions $g'$ and $g^3$ are pinned. As the rotation of the pinion $g'$ about the stub shaft G exceeds the rotation of the pinion carrier, the gear wheel $d'$ is driven in a reverse direction and such reverse movement is communicated to the sprocket wheel L.

The clutch band $e$ serves as a brake to frictionally engage the flange on the disk E and retard the rotation of the driven element and of the mechanism operatively connected to the sprocket wheel L.

It will be noticed that the pinions upon the stub shafts and gears with which they mesh are completely surrounded by the casing F, thereby protecting the pinions and gear wheels from dust and muffling the noise which they make when in action.

From the foregoing description it will be observed that I have invented an improved transmission gearing in which the driven element may be directly connected to the rotating power shaft, in which the driven element may also be connected to the power shaft through interposed speed reducing gearing, and in which the driven element may be driven in a reverse direction to that of the rotating shaft, such different movements of the driven element being easily effected by extremely simple mechanical means.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention, what I claim as new, and desire to secure by Letters Patent, is—

1. In a transmission mechanism, the combination with a driving element, of two clutch members fixed to the driving element, two clutch members movable relatively to the driving element, means for separately engaging said movable clutch members with said fixed clutch members, a driven element, means rigidly connecting one of said movable clutch members with the driven element, and differential mechanism interposed between the second movable clutch member and said driven element for driving the latter at less speed than the speed of the driving element.

2. In a transmission mechanism, the combination with a driving element, of two clutch members fixed to the driving element, two clutch members movable relatively to the driving element, means for separately engaging said movable clutch members with said fixed clutch members, a driven element, means rigidly connecting one of said movable clutch members with the driven element, and differential mechanism interposed between the second movable clutch member and said driven element for rotating the latter in a reverse direction to the rotation of the driving element.

3. In a transmission mechanism, the combination with a driving element, of two clutch members fixed to the driving element, two clutch members movable relatively to the driving element, means for separately engaging said movable clutch members with said fixed clutch members, a driven element, means rigidly connecting one of said movable clutch members with the driven element, a casing rigidly secured to the second movable clutch member, and differential gearing carried in said casing engaging said driven element.

4. In a transmission mechanism, the combination with a driving shaft, of two clutch members fixed to said shaft, a driven sleeve rotatively surrounding and axially movable upon said shaft, means for axially moving said sleeve upon said shaft, a clutch member fixed to said sleeve and adapted to engage one of the clutch members on the shaft, a second clutch member rotatively surrounding but axially immovable upon said sleeve and adapted to engage the second clutch member on the shaft, and speed reducing mechanism interposed between said sleeve and the second clutch member rotatively mounted thereon.

5. In a power transmission mechanism, the combination with a driving shaft, of a fly wheel fixed thereon, two clutch members fixed to said fly wheel, a driven sleeve rotatively surrounding and axially movable upon said shaft, a clutch member fixed to said sleeve and adapted to engage one of the clutch members on the fly wheel, a second clutch member rotatively surrounding said sleeve and adapted to engage a second clutch member on the fly wheel, and gearing interposed between said sleeve and the second clutch member thereon.

6. In a transmission mechanism, the combination with a driving shaft, of two clutch members fixed to said shaft, a driven sleeve rotatively surrounding and axially movable upon said shaft, means for axially moving said sleeve upon said shaft, a clutch member fixed to said sleeve and adapted to engage one of the clutch members on the shaft, a second clutch member rotatively surrounding but axially immovable upon said sleeve and adapted to engage the second clutch member on the shaft, a casing rigidly secured to the clutch member which rotatively surrounds said sleeve, two pinions fixed together and journaled in said casing, a gear wheel fixed upon said sleeve in mesh with one of said pinions, a second sleeve loosely surrounding said first sleeve, a gear wheel fixed to said second sleeve meshing with the second of said pinions, and means for locking said second sleeve against rotation.

7. In a transmission mechanism, the combination with a driving shaft, of two clutch members fixed to said shaft, a driven sleeve rotatively surrounding and axially movable upon said shaft, means for axially moving said sleeve upon said shaft, a clutch member fixed to said sleeve and adapted to engage one of the clutch members on the shaft, a second clutch member rotatively surrounding but axially immovable upon said sleeve and adapted to engage the second clutch member on the shaft, a casing rigidly secured to the clutch member which rotatively surrounds said sleeve, three pinions fixed together and journaled in said casing, a gear wheel fixed upon said sleeve in mesh with one of said pinions, a second sleeve loosely surrounding said first sleeve, a gear wheel fixed to said second sleeve in mesh with the second of said pinions, a third sleeve loosely surrounding the second sleeve, a gear wheel fixed upon said third sleeve in mesh with the third of said pinions, and means for separately locking said second and third sleeves against rotation.

8. In a transmission mechanism, the combination with a driving shaft, of two clutch members fixed to said shaft, a driven sleeve rotatively surrounding and axially movable upon said shaft, means for axially moving said sleeve upon said shaft, a clutch member fixed to said sleeve and adapted to engage one of the clutch members on the shaft, a second clutch member rotatively surrounding but axially immovable upon said sleeve and adapted to engage the second clutch member on the shaft, a casing rigidly secured to the clutch member which rotatively surrounds said sleeve, three pinions fixed together and journaled in said casing, a gear wheel fixed upon said sleeve in mesh with one of said pinions, a second sleeve loosely surrounding said first sleeve, a gear wheel fixed to said second sleeve in mesh with the second of said pinions, a third sleeve loosely surrounding the second sleeve, a gear wheel fixed upon said third sleeve in mesh with the third of said pinions, disks radially surrounding and fixed upon said sleeves, clutch bands surrounding and adapted to engage said disks to separately lock said sleeves against rotation.

9. In a transmission mechanism, the combination with a driving shaft, of two clutch members fixed to said shaft, a driven sleeve loosely surrounding and axially movable upon said shaft, means for axially moving said sleeve, a clutch member fixed on said sleeve adapted to engage one of the clutch members on said shaft when the sleeve is axially moved in one direction, a second clutch member axially movable with said sleeve, and adapted to engage the second clutch member on said shaft when the sleeve is axially moved in the other direction.

In testimony whereof, I sign this specification in the presence of two witnesses.

ROBERT SYMMONDS.

Witnesses:
H. W. JEFFERY,
G. H. EDDY.